J. A. PETERS.
FRONT WHEEL DRIVE FOR TRACTION ENGINES.
APPLICATION FILED OCT. 21, 1907.

905,918.

Patented Dec. 8, 1908.
2 SHEETS—SHEET 1.

Witnesses.

Inventor

J. A. PETERS.
FRONT WHEEL DRIVE FOR TRACTION ENGINES.
APPLICATION FILED OCT. 21, 1907.
905,918.
Patented Dec. 8, 1908.
2 SHEETS—SHEET 2.
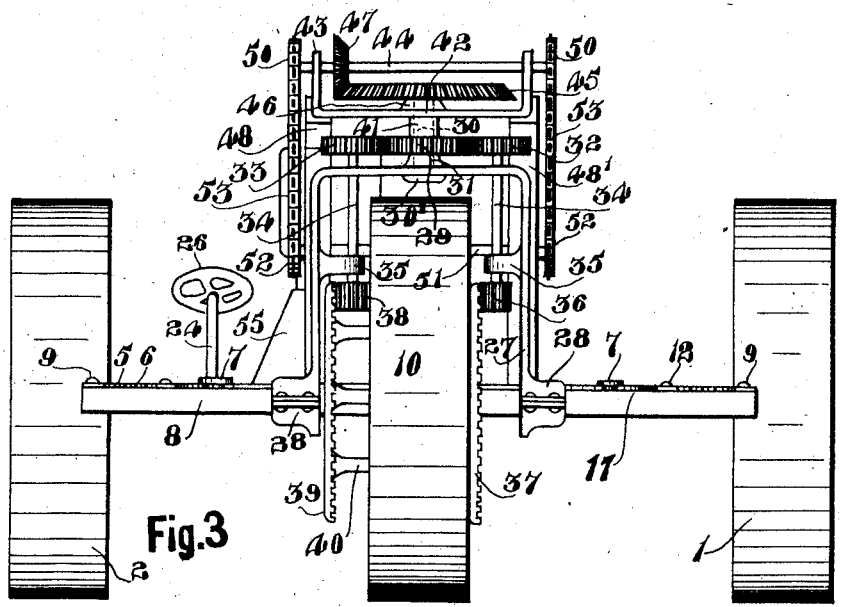
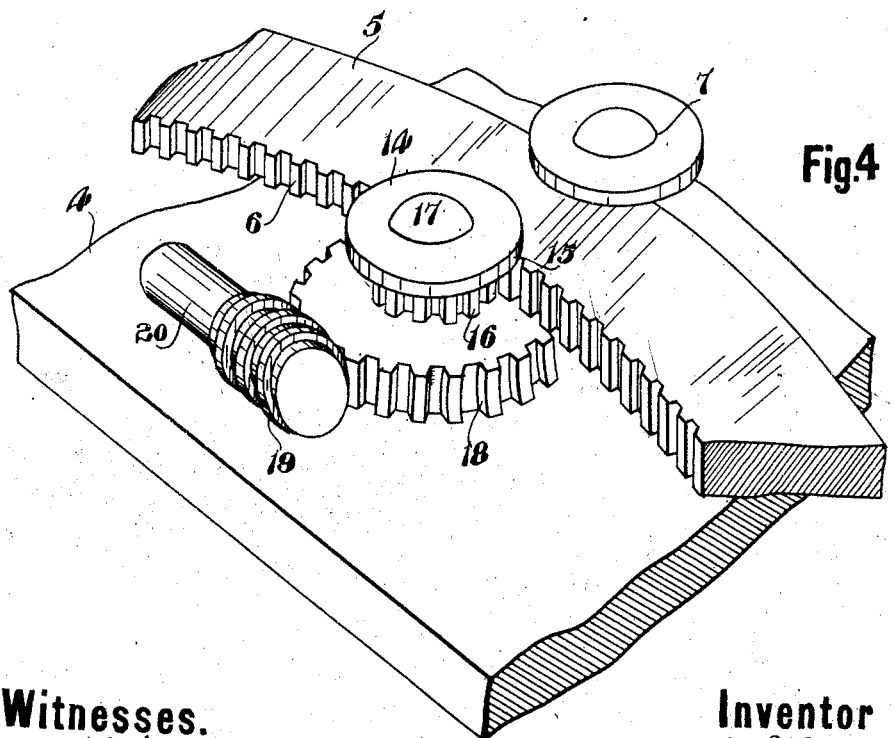
Witnesses.
Inventor

UNITED STATES PATENT OFFICE.

JOHN A. PETERS, OF PLUM COULEE, MANITOBA, CANADA.

FRONT-WHEEL DRIVE FOR TRACTION-ENGINES.

No. 905,918.      Specification of Letters Patent.      Patented Dec. 8, 1908.

Application filed October 21, 1907. Serial No. 398,511.

*To all whom it may concern:*

Be it known that I, JOHN ARON PETERS, of the village of Plum Coulee, in the Province of Manitoba, Canada, have invented certain new and useful Improvements in Front-Wheel Drives for Traction-Engines, of which the following is the specification.

My invention relates to front wheel drives for traction engines, and the object of the invention is to provide means whereby the forward or leading wheel in any form of vehicle, agricultural implement, or motor tractor, may be independently driven, such driving gear being connected to allow for all the turning that is required in a leading wheel.

It consists essentially in a semi-circular rack toothed on the inner edge and actuated by inter-meshing gears, a lower cross shaft connecting the extending ends of the rack, an inner semi-circular beam connected to the shaft at its ends, the beam and the rack being held to the traction platform by spools, a traction wheel revoluble on the shaft, an upright yoke-shaped frame fastened to the shaft, a central gear wheel connected directly to a vertical shaft extending upwardly from the horizontal member of the latter frame, a gear meshing to the right and left of the latter gear, such gears being interconnected through shafts and pinions with teeth on the face of the traction wheel, a bevel wheel at the upper end of the vertical shaft, and a bevel pinion engaging the latter wheel, such bevel wheel being carried by an upper cross shaft mounted in a suitable bearing, the bearing being free to move in respect to the vertical shaft, angle braces passing from the latter bearing to the traction platform, a cross shaft supported by the braces, gear wheels at the ends of the upper cross shaft, gear chains inter-connecting the latter gear wheels with the gear wheels carried by the cross shaft on the braces, a suitable engine on the platform and a drive chain connecting the engine with a gear wheel on the brace cross shaft, the parts being arranged and constructed as hereinafter more particularly described.

Figure 1:
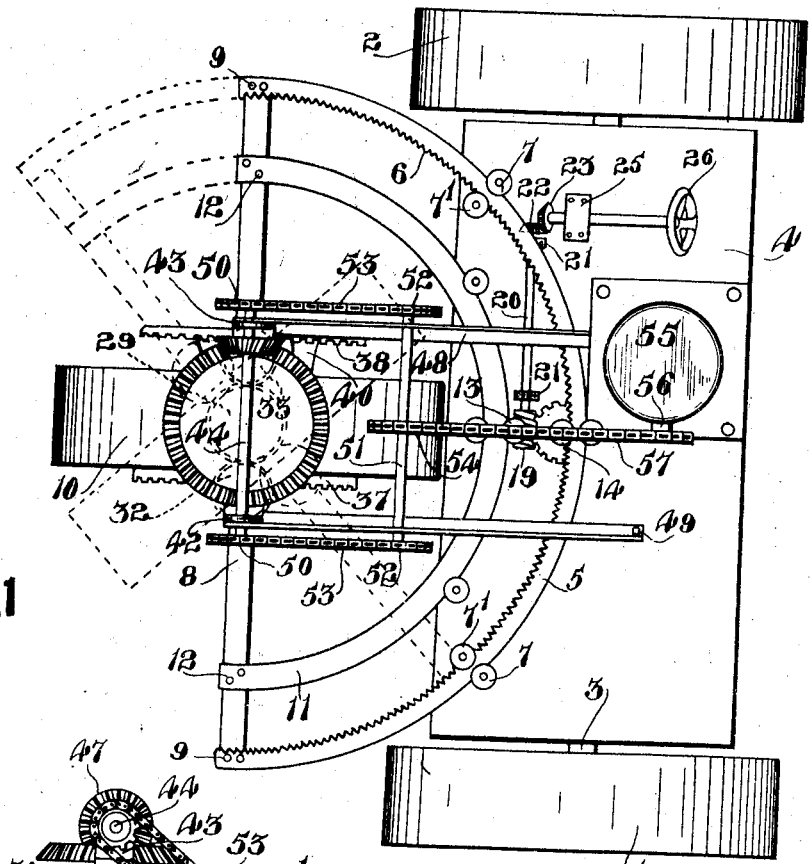
Figure 2:
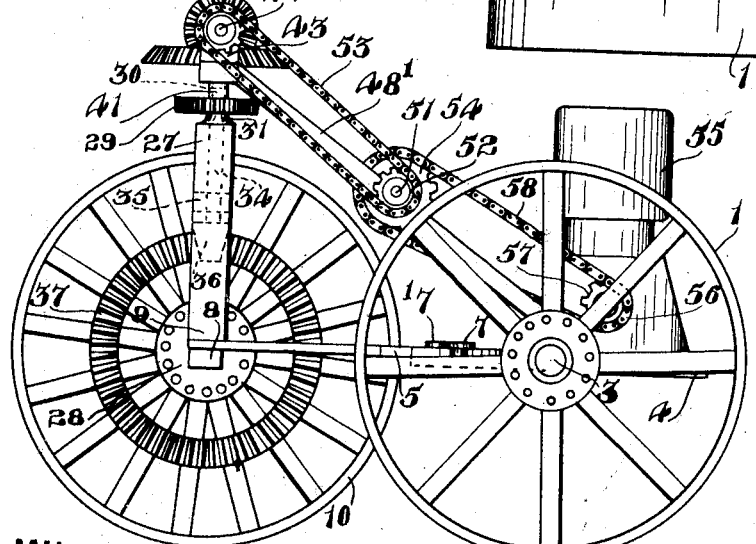

Figure 1 is a plan view of my complete invention, the forward drive wheel being shown dotted in a second position. Fig. 2 is a side elevation of the invention, as in Fig. 1. Fig. 3 is a front end elevation. Fig. 4 is an enlarged, detailed, perspective view of the means holding the semi-circular rack to the platform, as well as the inter-connection for the steering gear.

In the drawings like characters of reference indicate corresponding parts in each figure.

I have shown my invention applied to a motor tractor, and although I have not shown any means whereby the hind or traction wheels are driven, yet it will be understood that these are propelled in any of the well known ways now on the market. I concern myself only with the manner in which the front wheel is individually operated, and it will be understood that when the machine is in actual use all the wheels are driven from the motor.

I have found that with the ordinary four wheeled motor tractor, having simply two rear drive wheels, that in many cases it has not fully filled all requirements, as oftentimes a machine has gotten stuck in the mud, or the wheels have skidded in wet clay soil, and the machine could not release itself without outside aid. To avoid this difficulty I have provided a third wheel, as already suggested, and have found it to work satisfactorily as in nearly all cases one of the wheels can catch solid ground.

1 and 2 are the rear traction wheels which may be of any desirable form, such wheels being interconnected by an axle 3.

4 is a platform supported by the axle and between the wheels.

5. Is a semi-circular rack, having teeth 6 on its inner edge, such rack being placed on the platform to extend forwardly and held to the platform by spools 7 7' as will be hereinafter more particularly described.

8 is a lower cross shaft, fastened at its ends at 9 to the rack, and such shaft is for the greater part of its length square, being rounded centrally to receive the forward traction wheel 10, which is free to rotate on the shaft.

11 is an inner semi-circular beam, fastened at 12 to the lower shaft 8. The beam passes over the front of the platform and is held there by spools 13, of the same form as those shown at 7. The spools 13 are set back far enough on the platform to give a good bearing face to the beam 11 on the platform, it being noted that the beam passes between the bodies of the spools, which extend over and under and hold the beam.

The spools 7' have their bodies formed with teeth to mesh with the teeth on the inner face of the rack and are pivoted on pins or bolts passing centrally through them into the platform.

14 is the central spool, which is considerably different from the others, it having the ordinary head 15, with a toothed body portion 16 engaging with the teeth on the rack 5.

Directly beneath the rack and centered on the spool bolt 17 is a worm wheel 18 which is in mesh with a worm 19 at the end of the shaft 20. The shaft is suitably mounted in bearings 21 carried on the platform, and has at the opposing end to the worm a bevel gear 22.

23 is a bevel gear meshing with the gear 22, and 24 is a steering post extending upwardly from the bevel gear, such post being carried in any convenient bearing 25 on the platform.

26 is a hand wheel at the upper end of the steering post. It will be seen that by turning the hand wheel the rack 5 can be turned at will, and that according to the ratio of the gears and the worm and worm wheel, so the quickness of the action of the rack.

27 is a yoke-shaped frame, extending up and over the forward traction wheel 10, and it is connected directly to the square portion of the shaft at 28 on either side of the wheel. It will of course be understood that the distance between the shaft and the front of the platform, when the front traction wheel is directly facing the front, is somewhat greater than the radius of the traction wheel, or in other words the traction wheel is free to move forward of the platform.

29 is a gear wheel carried on a vertical shaft 30, extending upwardly from the center of the horizontal member of the frame 27, the said shaft being rotatable in a bearing 30' carried by the horizontal member, and 31 is a bearing face for the under side of the wheel.

32 and 33 are pinions to the right and left of the gear wheel 29, meshing therewith. The latter gears are carried at the upper end of the shafts 34, which are journaled in any suitable form of bearing 35, extending inwardly from the yoke frame.

36 is a gear at the lower end of the shaft 34, such gear being designed to mesh with a circular toothed plate 37 on the face of the forward traction wheel.

38 is a gear engaging directly with a toothed plate 39, off-set from the face of the traction wheel by means of arms 40, which extend from the wheel. With this connection it will be seen that the rotation of the gear wheel 29 is directly conveyed to the traction wheel, and that both the gears 36 and 38 drive the wheel in the same direction.

41 is a loose sleeve on the shaft 30, directly above the upper face of the gear 29.

42 is a cross plate pivoted centrally on the vertical shaft and bearing on the upper side of the loose sleeve, and has its ends turned upwardly at 43, forming bearings for an upper cross shaft 44.

45 is a large bevel gear at the upper end of the shaft 30, and 46 is a bearing face on the plate 42 for the gear.

47 is a bevel pinion meshing with the bevel gear, said gear being carried by the shaft 44.

48 48' are two angle braces passing downwardly and rearwardly from the plate 42 to the platform, to which they are secured by bolts 49.

50 are chain wheels at the ends of the shaft 44, outside the bearings 43.

51 is a cross shaft carried by the vertical arms of the angle braces, and 52 are chain wheels at the end of the latter shaft, such wheels being directly connected by chains 53 to the upper set of wheels 50.

54 is a chain wheel secured centrally on the shaft 51.

55 is any suitable form of engine mounted on the platform, and 56 is the main drive shaft of the engine.

57 is a chain wheel on the drive shaft and 58 is a chain interconnecting the wheel 57 with the wheel 54.

The braces 48 keep the plate 42 in a set position with regard to the platform, its position being the same as the main shaft 8 when the forward traction wheel is directly to the front.

A movement of the rack by means of the hand wheel, as hereinbefore described, turns the yoke frame with the shaft 8, and the traction wheel 10, and this movement simply causes the gears 32 and 33 to change their position on the circumference of the gear 29, and in no matter what position the rack, and consequently the traction wheel may be in, it can always be driven by the engine.

What I claim as my invention is:

1. In a device of the class described the combination with the platform carried by a set of traction wheels and having a motive power thereon, of a semi-circular rack extending forwardly of the platform and movable thereon, a forward traction wheel rotatable on a shaft secured at its ends to the rack, an upright frame straddling the front traction wheel and carried by the shaft; a central gear pivoted on a vertical shaft bearing in the latter frame; gears inter-meshing with the latter gear and communicating through shafts and pinions with circular racks on the forward traction wheel, and driving means inter-connecting the motive power on the platform with the vertical shaft, as and for the purpose specified.

2. In a device of the class described the combination with the platform carried by a set of traction wheels and having a motive power thereon, of a forwardly extending semi-circular rack adapted to turn on the platform; means for turning the rack; a shaft inter-connecting the extending ends of the rack; a forward traction wheel rotatable on the shaft and centrally of its length; an inner semi-circular reinforcing beam fastened at its ends to the shaft and free to turn in bearings on the platform; an upright frame straddling the forward traction wheel and fastened to the shaft; a central gear wheel on a vertical shaft pivotally supported in the upper cross portion of the frame; a set of gears inter-meshing with the latter gear and carried by vertical shafts operating in bearings extending from the frame; pinions at the lower extremities of the latter shafts inter-meshing with circular racks carried by the forward traction wheel; an upper cross plate pivoted centrally on the former vertical shaft and having upturned ends forming bearings for an upper cross shaft; a bevel wheel above the plate and connected to the said vertical shaft; a bevel pinion on the upper cross shaft meshing with the bevel wheel; braces passing from the upper cross plate to the platform; and driving means inter-connecting the motive power on the platform with the upper cross shaft, as and for the purpose specified.

3. In a device of the class described the combination with the platform carried by a set of rear traction wheels, of a semi-circular rack having teeth on its inner edge, a set of spools pivotally fastened to the platform and operating on the rear edge of the rack; a set of similarly pivoted spools having the body toothed and engaging with the forward face of the rack; a cross shaft connecting the extending ends of the rack; a traction wheel rotatably mounted on the shaft; and means for turning the rack, as and for the purpose specified.

4. In a device of the class described the combination with the platform carried by a set of rear traction wheels, of a semi-circular rack having the teeth on its inner edge, a set of spools pivotally fastened to the platform and operating on the rear edge of the rack; a set of similarly pivoted spools having the body toothed and engaging with the forward face of the rack; a cross shaft connecting the extending ends of the rack; a traction wheel rotatably mounted on the shaft; a spool centrally pivoted on the platform, said spool having its body portion toothed and engaging with the rack, and its lower end in the form of a worm wheel, a worm engaging the worm wheel, said worm being carried by a shaft suitably mounted on the platform, said shaft being connected through a set of bevel wheels with a steering post, as and for the purpose specified.

5. In a device of the class described the combination with the platform carried by a set of traction wheels and having a motive power supported thereon, of a semi-circular rack extending forwardly of the platform and carried by opposing spools pivoted on the platform; a cross shaft inter-connecting the extending ends of the rack; an inner semi-circular reinforcing beam fastened to the shaft and extending rearwardly to the platform, and operating in spools pivoted on the platform; a forward traction wheel rotatably mounted centrally on the shaft; an upright frame straddling the wheel and fastened to the shaft; a set of circular racks fastened to the face of the forward traction wheel, one of the racks being off-set from the wheel; a central gear wheel on a vertical shaft pivoted at its lower end within bearings formed in the cross portion of the upright frame; gear wheels, one at either side of the latter gear, and inter-meshing therewith, said gears being carried by downwardly extending shafts mounted in bearing brackets extending inwardly from the upright frame; pinions at the end of the shafts adapted to operate on the racks fastened to the traction wheel; an upper cross plate centrally mounted on the vertical shaft and bearing on a sleeve on the shaft above the central gear wheel, the said cross plate having upwardly extending arms forming bearings for an upper cross shaft; a bevel gear at the upper end of the vertical shaft; a bevel pinion on the upper cross shaft inter-meshing with the bevel gear; angle braces connecting the upper cross plate with the platform; a cross shaft mounted on the braces and carrying an outer set and a central chain wheel; chain wheels at the extremities of the upper cross shaft; chains inter-connecting the latter chain wheels with the outer set of wheels on the shaft mounted on the braces; and a chain interconnecting the main drive wheel of the motive power with the central chain wheel on the cross shaft carried by the angle braces, as and for the purpose speciffed.

Signed at Altana, in the Province of Manitoba, this 5th day of Oct. 1907.

JOHN A. PETERS.

Witnesses:
  A. H. LALPPKY,
  JACOB E. FUNK.